(12) United States Patent
Green

(10) Patent No.: US 6,987,626 B2
(45) Date of Patent: Jan. 17, 2006

(54) VIBRATION MONITORING IN OPTICAL AND OPTO-ELECTRONIC BEAM GUIDING SYSTEMS

(75) Inventor: Evan D. H. Green, San Jose, CA (US)

(73) Assignee: New Focus, Inc., San Jose, CA (US)

( * ) Notice: Subject to any disclaimer, the term of this patent is extended or adjusted under 35 U.S.C. 154(b) by 116 days.

(21) Appl. No.: 10/394,369

(22) Filed: Mar. 20, 2003

(65) Prior Publication Data

US 2004/0182997 A1    Sep. 23, 2004

(51) Int. Cl.
G02B 7/02    (2006.01)
(52) U.S. Cl. .................... 359/820; 359/819; 359/821
(58) Field of Classification Search ............. 359/819, 359/820, 821, 824, 811, 823, 822
See application file for complete search history.

(56) References Cited

U.S. PATENT DOCUMENTS

| | | | |
|---|---|---|---|
| 4,566,327 A * | 1/1986 | Rider | 73/510 |
| 5,335,032 A | 8/1994 | Onuki et al. | |
| 5,585,875 A | 12/1996 | Imafuji et al. | |
| 5,682,556 A | 10/1997 | Iwane et al. | |
| 5,740,472 A | 4/1998 | Hirano | |
| 6,389,899 B1 | 5/2002 | Partridge et al. | |
| 6,456,939 B1 | 9/2002 | McCall et al. | |
| 6,462,895 B2 * | 10/2002 | Hunter | 359/819 |
| 2002/0145669 A1 * | 10/2002 | Umeda et al. | 348/220.1 |
| 2002/0154669 A1 * | 10/2002 | Spangler et al. | 372/55 |

OTHER PUBLICATIONS

Kevin E. Burchman et al., "Micromachined Silicon Cantilever Beam Accelerometer Incorporating an Integrated Optical Waveguide", SPIE, vol. 1793, (1992), pp. 12-18.

S. Grafstrom, U. Harbarth, J. Kowalski, R. Neumann and S. Noehte, "Fast Laser Beam Position Control with Submicroradian Precision", Optics Communications, vol. 65, No. 2, Jan. 15, 1988.

* cited by examiner

Primary Examiner—Ricky L. Mack
Assistant Examiner—Brandi Thomas
(74) Attorney, Agent, or Firm—Lumen Intellectual Property Services, Inc.

(57) ABSTRACT

An optical component mount with beam deviation monitoring and beam guiding system using such optical component mounts. The optical component mount has a location for mounting an optical element thereon for operating on the beam and at least one sensor attached to the optical mount at a predetermined position to at least one mode of the optical component mount. The predetermined position is selected depending on the state of the optical component mount. The state can be, e.g., a vibrational state or a thermal expansion state. The predetermined position is chosen near or at an anti-node of at least one mode contributing to the state. The state of the optical mount is determined based on the signals obtained from the at least one sensor, which can be an accelerometer in the case of monitoring a vibrational state or a temperature sensor in the case of monitoring a thermal expansion state.

30 Claims, 6 Drawing Sheets

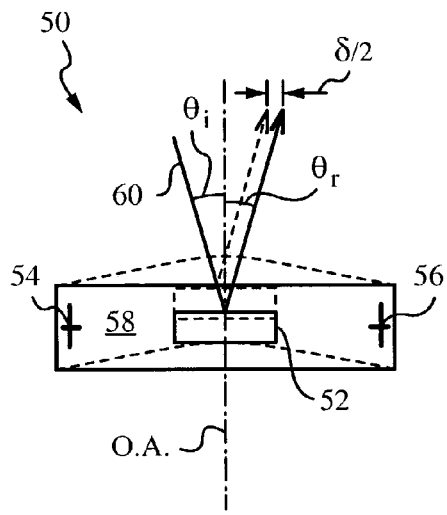
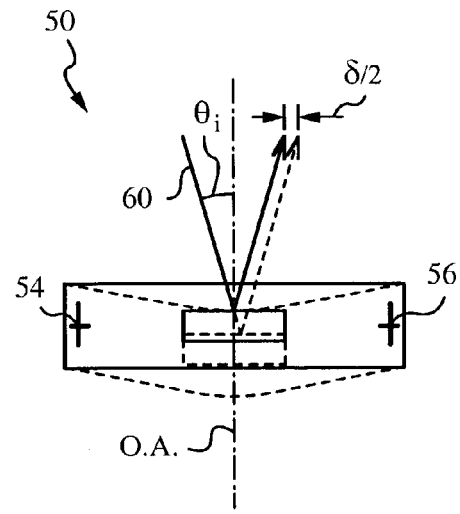
*FIG. 3A*  *FIG. 3B*
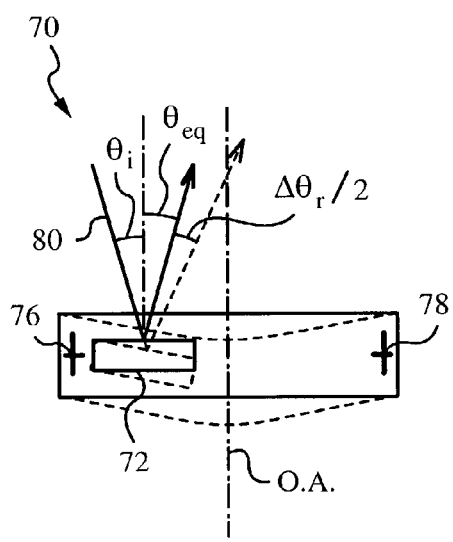
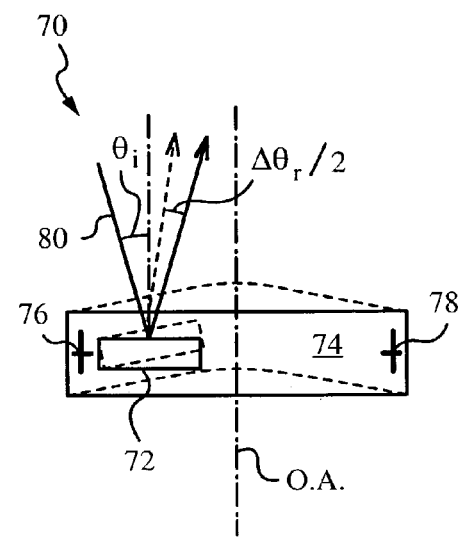
*FIG. 4A*  *FIG. 4B*

VIBRATION MONITORING IN OPTICAL AND OPTO-ELECTRONIC BEAM GUIDING SYSTEMS

FIELD OF THE INVENTION

The present invention relates generally to the monitoring of vibrations affecting optical components and the optical path in opto-electronic and optical systems.

BACKGROUND OF THE INVENTION

Recent advances in the field of optics have led to the integration of optical elements into miniaturized optical assemblies as well as combinations of optical and electronic elements in miniaturized opto-electronic assemblies. Such assemblies include exposed assemblies as well as hermetically sealed optical and opto-electronic packages of various types. In most cases, mechanical and electronic elements are used for adjusting the positions, orientations and operation of the optical elements as well as for converting optical signals propagating in the form of beams into electronic signals and vice versa. More specifically, electro-mechanical actuators are used for adjusting and controlling the positions of optical elements, while the electronic elements are used for sensing position errors and for driving electro-mechanical actuators.

Whatever the function of the optical and opto-electronic assemblies, in most of them at least a portion of the optical, path of the beam or beams passes through free space rather than a waveguide. In other words, the beam or beams propagate through free space between waveguides or optical detection devices contained within the assembly. In some assemblies the beam or beams are generated by a source, e.g., a laser diode, and after out-coupling from the diode they propagate through free space to all the subsequent optical elements without ever being in-coupled into a waveguide. For example, in a laser pointing or aiming device, a beam is generated by a laser diode and propagates through free space to the collimating and focusing lenses as well as any deflectors (mirrors) and to the target outside the laser pointer.

For the above reasons, many of the elements contained in optical and/or opto-electronic assemblies perform the functions of beam steering or guiding systems. In particular, the beam guiding systems typically consist of optical elements such as mirrors, lenses, refractive elements and/or diffractive elements as well as optical component mounts and opto-mechanical components for positioning and supporting these optical elements. These elements are usually passive.

Optical and opto-electronic assemblies are frequently exposed to environments or mechanisms producing mechanical vibrations. Among the many mechanisms responsible for such vibrations one can mention microphone pickup, air disturbance, vibration coupling from other assemblies and/or external mechanical parts, mechanical shock, and slower thermal drifts. The vibrations translate to deflections of the beam because the optical elements of the beam guiding system move relative to each other. A number of even relatively small deflections occurring at several optical elements can add up to an unacceptably large total deflection of the beam. For example, in the case of a laser pointer, several small deflections in the beam guidance system can add up to a significant fraction of a degree total deflection, which is unacceptable to the user. Of course, in some cases deflection of the beam at just one optical element is sufficient to cause an unacceptable total deflection of the beam. Hence, it would clearly be advantageous for the beam guiding system to be immune to vibrations.

The prior art teaches a number of mechanisms developed for reducing or compensating vibrations in large-scale optical systems such as cameras. For example, U.S. Pat. No. 5,585,875 to Imafuji et al. discloses a camera having a vibration correction system that detects vibration of the camera caused, e.g., by hand tremor, and corrects for the vibration of an image in an image plane caused by vibration of the camera. Imafuji's system detects the vibration with the aid of vibration sensors, e.g., acceleration sensors. The reader will find additional teachings on vibration detection and compensation methods for cameras and optical imaging systems in the open literature, including U.S. Pat. Nos. 5,740,472; 5,682,556 and 5,335,032.

For further information about acceleration sensors, also called accelerometers, the reader is referred to U.S. Pat. No. 6,389,899 to Partridge et al. and Kevin E. Burcham et al., "Micromachined Silicon Cantilever Beam Accelerometer Incorporating an Integrated Optical Waveguide", SPIE, Vol. 1793, (1992), pp. 12–18. For further information about measurement units incorporating acceleration sensors the reader is invited to review U.S. Pat. No. 6,456,939 to McCall et al.

Unfortunately, the above teachings cannot be used to resolve vibration-related problems in modern optical and opto-electronic assemblies for a number of reasons. First, the solutions implemented in cameras and other large optical devices including imaging systems simply do not scale to the miniature optical and opto-electronic assemblies. Second, the solutions implemented in cameras, which are a single integrated system with a well-defined end use, cannot be generalized to components used in laboratory environments where the end-use cannot be predicted. Third, the mechanisms used to compensate for vibrations in large-scale devices such as cameras include shutter timings, exposure controls and other controls that have no equivalents in optical and opto-electronic assemblies. Fourth, cameras are devices that accept light from an outside source, and may compensate for motion of the imaging device relative to the inertial coordinate frame by internal detection of vibration signals. In contrast, modern optical and opto-electronic assemblies are non-imaging devices with their own light sources, e.g., solid-state lasers.

Therefore, in response to vibration-related problems encountered in small-scale optical and opto-electronic assemblies, most prior art references teach to monitor output deflection of a beam 1 exiting from an optical or opto-electronic assembly 2 as shown in FIG. 1. For this purpose a beam portion 3 of beam 1 steered by elements 4 of assembly 2 is tapped with the aid of a beam splitting element 5. Beam portion 3 is delivered to an optical position sensor 6, which tracks the position at which beam portion 3 is incident and/or monitors its spot size. Further information about such systems can be found in S. Grafstrom, U. Harbarth, J. Kowalski, R. Neumann and S. Noehte, "Fast Laser Beam Position Control with Submicroradian Precision", Optics Communications, Vol. 65, No. 2, 15 Jan. 1988.

Unfortunately, monitoring of vibration by tapping the output beam has many drawbacks. First and foremost, tapping introduces losses and potential for undesired back-reflections. Second, the introduction of tapping optics is not feasible and downright impossible in many systems due to dimensional constraints. Third, the tapping method typically monitors a total deflection of the beam at the output of the assembly and hence does not yield any information about the optical elements causing the deflection. Fourth, a monitoring method based on tapping is limited to observation of the position or vibration of an output beam relative to its local surroundings. In the case of a hand-held, or otherwise movable device, the output may move relative to a world (inertial) coordinate frame, and be undetectable by an internal tap.

The problems associated with vibrations are especially acute in systems employing optical component mounts for supporting the optical elements. In such systems the optical mounts transfer vibrations associated with their vibrational states to the optical elements mounted on the optical mounts.

OBJECTS AND ADVANTAGES

In view of the shortcomings of the prior art, it is a primary object of the present invention to provide optical component mounts and beam guiding systems using optical component mounts having the capability to monitor beam deviation produced by various types of vibrations. More specifically, the monitoring is to be applied to optical and opto-electronic beam guiding systems exposed to vibrations. The optical mount can also include a vibration compensator to counteract beam deviation. These and numerous other objects and advantages of the present invention will become apparent upon reading the following description.

SUMMARY

An optical component mount equipped with beam deviation monitoring achieves the objects and advantages of the invention. The optical component mount has a location for mounting an optical element thereon. The optical element is designed for operating on a beam and at least one sensor is attached to it for determining a state of the optical mount. In accordance with the invention, the sensor is attached to the optical mount at a predetermined position to at least one mode of the optical component mount. The deviation of the beam is then determined from the state of the optical mount. Most commonly, the state is a vibrational state or a thermal expansion state, although other states causing beam deviation are also within the scope of the present invention. More specifically, the predetermined position is at an anti-node of at least one mode contributing to the state of the optical mount. Even more conveniently, the predetermined position is not at a node of any mode expected to contribute to the state of the optical mount. Thus, for example, in the case of a vibrational state the predetermined position is at an anti-node or at least not at any node of any vibrational mode contributing to the vibrational state. Optical mounts according to the invention can be used in any beam guiding system including but not limited to those found in optical and/or opto-electronic assemblies.

Depending on the state being monitored, the sensor is a temperature sensor or an acceleration sensor. Specifically, acceleration sensors are convenient for monitoring vibration while temperature sensors are convenient for monitoring thermal expansion. Preferably, a sensor circuit is in communication with the sensor to determine the deviation of the beam due to the state of the optical mount. Specifically, the various modes making up the overall state of the optical mount are recognized by the sensor circuit and translated into a corresponding deflection of the beam.

In some embodiments the optical component mount is equipped with a compensator such as a vibration compensator or a thermal compensator (heater/cooler). A vibration compensator is in mechanical communication with the optical mount such that it can counteract the vibrational state, e.g., by applying a restoring or damping force to minimize beam deflection. A thermal compensator is in thermal communication with the optical mount. Various types of elements including piezoelectric actuators, voice coil electromagnetic actuators, servo motors, stepper motors, Peltier heaters/coolers can be used as vibration and thermal compensators. In some embodiments no compensator is used and the output from the sensor is delivered to a display for any number of monitoring and/or control functions desired by the user (e.g., graphing, delivery to computer for further analysis, etc.).

The optical mount can carry any desired optical element or even several optical elements including mirrors, lenses, gratings, beam-splitters, sources, detectors or any other active or passive optical elements. The user can select the desired physical parameters of the optical mount as well as the type of mount. In fact, optical mounts of the invention can include mirror mounts, translation stages, tilt stages, rotational stages, goniometers and optical breadboards.

A beam guiding system with beam deviation monitoring according to the invention takes advantage of a number of optical component mounts and a number of optical elements mounted on these mounts for operating on the beam. At least one sensor is attached to at least one of the optical component mounts at a predetermined position for determining the state of the optical component mount. The deviation of the beam is determined from the state of the optical mount, as described above. Preferably, the beam guiding system is provided with an evaluation unit for translating the state of the at least one optical component mount into a total deviation of the beam. In one particular application, the beam guiding system is a laser pointer.

The invention further encompasses a method for controlling a deflection of a beam propagating in a beam guiding system using optical component mounts bearing optical elements. In accordance with the method, at least one sensor is attached to at least one of the optical mounts at a predetermined position. The position is selected such that the sensor can determine the state of the optical mount. To ensure that this can be done the predetermined position can be selected at an anti-node of at least one of the modes that are expected to contribute to the state of the optical mount. Preferably the predetermined position is also not at a node of any mode making up the state of the optical mount.

In general, optical mounts and guiding systems according to the invention enable the user to achieve inertial sensing relative to an arbitrary coordinate frame, inside or outside the beam guiding system. This capability makes it possible to determine beam deflection with respect to the coordinate frame outside of the beam guidance system and to adjust beam deflection with respect to the inertial frame. Such adjustment is especially useful in devices that deliver the beam for external uses, e.g., laser pointers.

A detailed description of the invention and the preferred and alternative embodiments is presented below in reference to the attached drawing figures.

BRIEF DESCRIPTION OF THE FIGURES

FIGS. 3A–B are top plan views illustrating the movement and resulting beam deflection produced by an optical component mounted on an optical mount experiencing a fundamental vibrational mode.

FIGS. 4A–B are top plan views illustrating the movement and resulting beam deflection produced by an optical component mounted off-center on another optical mount.

DETAILED DESCRIPTION

Figure 1:
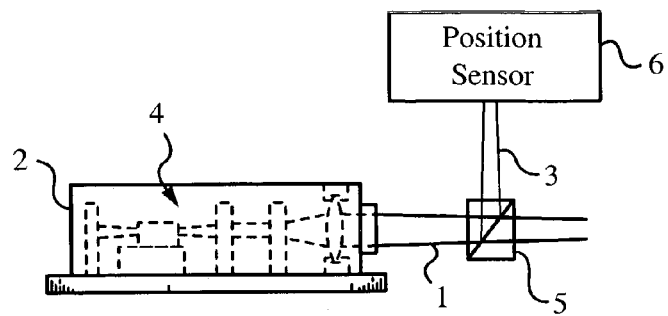
FIG. 1 (Prior Art) is a diagram illustrating a common prior art method of vibration sensing.
Figure 2:
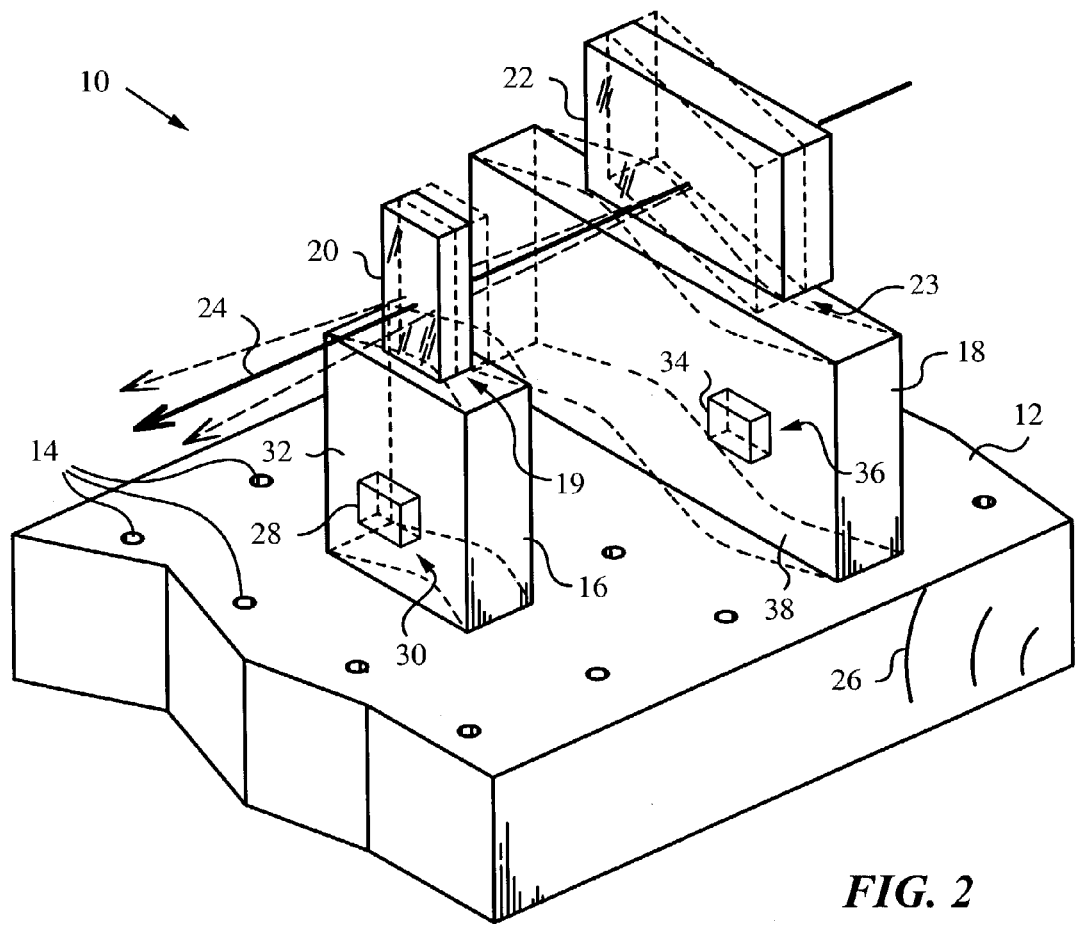
FIG. 2 is an isometric view of two optical component mounts bearing optical elements and being equipped with embedded sensors in accordance with the invention.

The instant invention will be best understood by first considering a portion of an optical assembly 10 illustrated in an isometric view in FIG. 2. Optical assembly 10 has an optical bench 12 with a number of mounting holes 14. A first optical component mount 16 and a second optical component mount 18 are set in mounting holes 14. Optical mount 16 bears an optical element 20 mounted in a location 19. Optical mount 18 bears an optical element 22 mounted in a location 23. In the present embodiment optical elements 20, 22 are transmissive elements for illustrative purposes. A person skilled in the art will realize that any type of optical element including passive and active optical elements can be mounted on optical mounts 16, 18. Such optical elements can include mirrors, lenses, gratings, beam-splitters, sources and detectors. Optical elements 20, 22 operate on a beam of light 24 passing through them as shown.

Thermal expansion states and mechanical vibration states have analogous effects in so far as they cause deformation of mounts 16, 18 and consequent deviation of beam 24. For the sake of simplicity optical assembly 10 will be explained based on mechanical vibrations 26. Specifically, mechanical vibrations 26 experienced by optical assembly 10 cause optical mounts 16, 18 to experience vibrations that place optical mounts 16, 18 into certain vibrational states. These vibrational states can consist of single vibrational modes or superpositions of several vibrational modes induced in optical mounts 16, 18 by mechanical vibrations 26. It is important to recognize that mechanical vibrations 26 can be produced by any source or a number of sources and that they can be persistent or transitory.

Optical mount 16 has a sensor 28 attached at a predetermined position 30 on a sidewall 32. Optical mount 18 has a sensor 34 attached at a predetermined position 36 on a sidewall 38. Sensors 28, 34 are of the type that sense displacement, stress, acceleration or any other suitable parameter that permits them to track movements of optical mounts 16, 18, respectively. Preferably, sensors 28, 34 are acceleration sensors or accelerometers. The selection of predetermined positions 30, 36 is made such that the vibrational state of optical mounts 16, 18 can be determined from the signals delivered by accelerometers 28, 34.

In the present embodiment optical mounts 16, 18 are shown experiencing vibrational states consisting of only one single vibrational mode. Specifically, optical mount 16 experiences a first or fundamental vibrational mode and optical mount 18 experiences a second vibrational mode. Both modes are indicated in dashed lines. To ensure that sensor 28 can efficiently detect the fundamental mode of optical mount 16 predetermined position 30 is at an anti-node of the fundamental mode. Similarly, predetermined position 36 is at an anti-node of second mode of optical mount 18.

Now, the vibrational states of optical mounts 16, 18 are typically more complex, since they usually result from a superposition of a number of vibrational modes experienced simultaneously by optical mounts 16, 18. In cases where two or more modes are expected to contribute to the vibrational state it will not be possible to position one sensor at the anti-nodes of these two or more modes. Instead the predetermined position is chosen not to coincide or be close to any node of any vibrational mode contributing to the vibrational state.

In accordance with the invention, the deviation of beam 24 is derived from the vibrational states of optical mounts 16, 18. In order for the deviation of beam 24 to be determinable from the vibrational states of optical mounts 16, 18 it is necessary to know the effects of the vibrational states on optical components 20, 22 located on optical mounts 16, 18. These effects depend on the vibrational modes making up the vibrational states as well as the mounting location of optical components 20, 22.

For a general understanding of the effects of vibrational states on optical components we refer now to FIGS. 3A–B, which illustrate the movement of an optical mount 50 in the fundamental vibrational mode and the corresponding movement of a reflective optical component 52. Optical mount 50 is fixed at mounting points 54, 56. Optical component 52 is mounted in the center of a top face 58 of optical mount 50 and an optical axis O.A. is drawn normal to optical component 52. A beam of light 60 is incident on reflective component 52 at an angle of incidence $\theta_i$ with respect to optical axis O.A. In the equilibrium position indicated in solid lines beam 60 is reflected by reflective component 52 at an angle of reflection $\theta_r$ equal to angle of incidence $\theta_i$.

The bending of optical mount 50 produced by the fundamental mode causes reflective component 52 to move between two extreme positions or extrema illustrated in FIGS. 3A–B by dashed lines. During this movement the orientation of reflective component 52 remains normal to optical axis O.A. Hence, beam 60 always strikes reflective component 52 at the same angle of incidence $\theta_i$ and is reflected at the same angle of reflection $\theta_r$. However, the position at which beam 60 strikes reflective component 52 changes and produces a linear deviation or offset $\delta$ in the reflected beam ($\delta/2$ away from the equilibrium position in each direction). It should be noted that linear deviation $\delta$ can be counteracted by moving optical mount 50 about the equilibrium position along optical axis O.A. by the same amplitude as that of the fundamental mode but 180 degrees out of phase with it.

FIGS. 4A–B illustrate the effects of the fundamental mode on a reflective optical component 72 located on an optical mount 70 at an off-center location on a top face 74. Optical mount 70 is fixed at mounting points 76, 78, and one of the edges of optical component 72 is very near or even above mounting point 76. An optical axis O.A. is shown passing through the center and normal to optical mount 70 in the equilibrium position, which is drawn in solid lines. A beam of light 80 is incident on reflective component 72 at an angle of incidence $\theta_i$ with respect to optical axis O.A.

The bending of optical mount 70 produced by the fundamental mode causes reflective component 72 to tilt between two extreme positions illustrated in FIGS. 4A–B by dashed lines. During this tilting the orientation of reflective component 72 undergoes a continuous change in inclination with respect to optical axis O.A. At the same time, because one edge of reflective component 72 is very near mounting point 76, reflective component 72 does not undergo any appreciable movement along optical axis O.A. As a result, the angle at which beam 80 is reflected by reflective component 72 varies from the equilibrium angle of reflection $\theta_{eq}$ by an angular deviation $\Delta\theta_r$ ($\Delta\theta_r/2$ away from the equilibrium position in each direction). It should be noted that angular deviation $\Delta\theta_r$ can be counteracted by rotating optical mount 70 about the pivot point of reflective component 72 at the same amplitude as that produced by the fundamental mode but 180 degrees out of phase with it.

In practical applications optical elements are mounted on optical mounts in locations where they experience both linear displacement and tilt due to the fundamental vibrational mode. These two movements produce linear and angular deviations of the beam. A person skilled in the art will realize that moving and rotating the optical mount at appropriate amplitude and phase with respect to the modes can counteract such combination of linear and angular deviations of the beam.

Figure 5A:
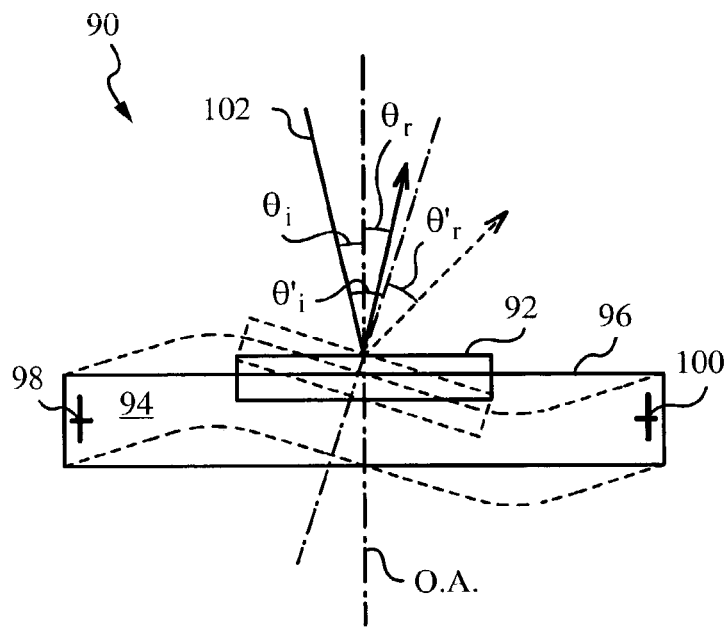
FIGS. 5A–B are top plan views illustrating the movement and resulting beam deflection produced by the optical component mounted on an optical mount experiencing a second vibrational mode.
Figure 5B:
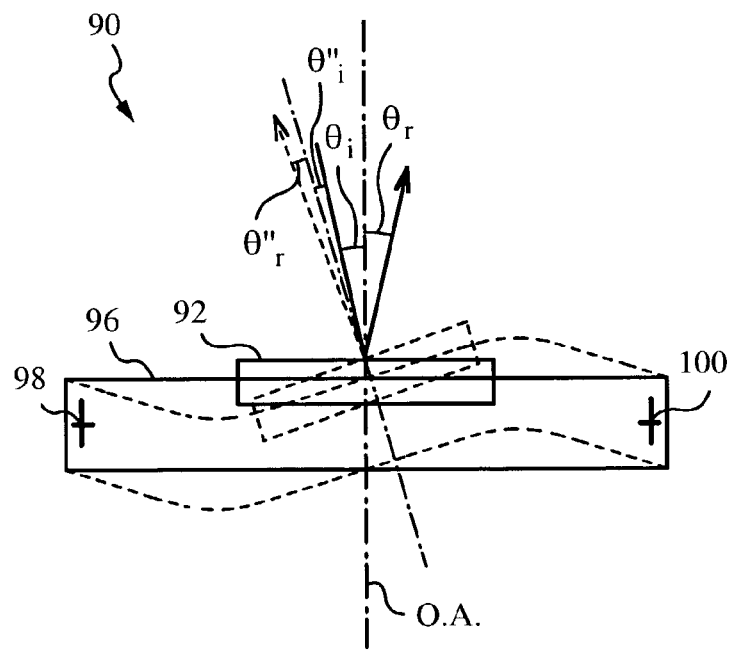

FIGS. 5A–B show the effects of a second vibrational mode on a reflective optical component 92 located on an optical mount 90. Optical component 92 is affixed on a top face 94 of optical mount 90 and overhangs an edge 96 of optical mount 90. The center of reflective component 92 is aligned with the center of optical mount 90. Optical mount 90 is fixed at points 98, 100 and an optical axis O.A. passes through the centers of reflective component 92 and optical mount 90 and is normal to both. The equilibrium position of optical mount 90 is drawn in solid lines.

A beam of light 102 is incident on reflective component 92 at an angle of incidence $\theta_i$ with respect to optical axis O.A. The second vibrational mode causes reflective component 92 to tilt about its center as indicated in dashed lines while undergoing no linear movement. As a result, the angle of incidence of light 102 on reflective component 92 varies from $\theta_i$ to $\theta'_i$ during a first half of the vibrational period and from $\theta_i$ to $\theta''_i$ during the second half of the vibrational period. Correspondingly, the angle of reflection varies between $\theta'_r$ to $\theta''_r$ over the vibrational period.

The angular deviation of beam 102 due to the tilting of reflective component 92 produced by the second mode is considerable and can be counteracted by rotating optical mount 92. Of course, reflective component 92 can also be positioned at other locations on optical mount 90 where it may experience linear motion only, or any combination of linear motion as well as tilt. In these locations reflective component 92 will produce linear deviation or linear and angular deviation of beam 102.

Figure 6:
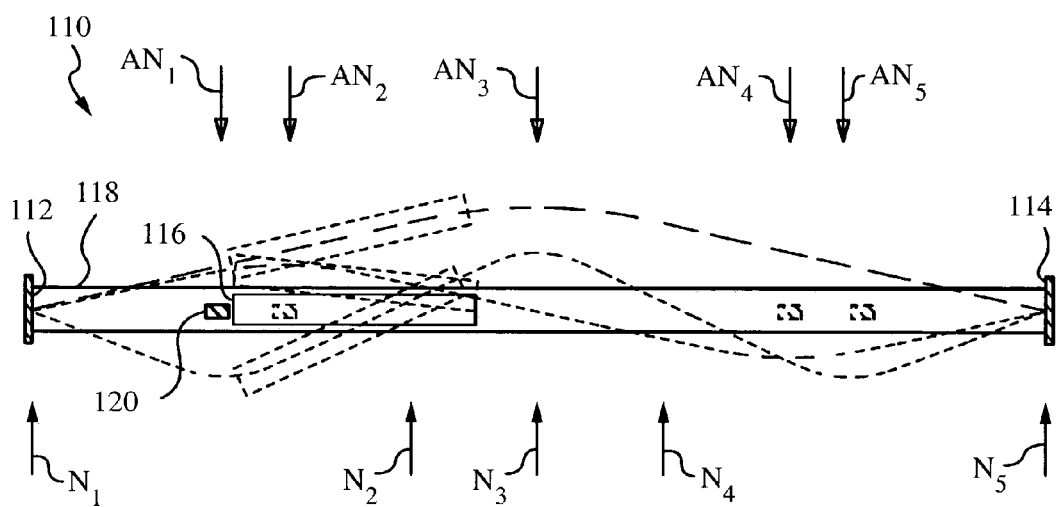
FIG. 6 is a diagram illustrating appropriate positions for attaching sensors in an optical mount whose vibrational state is made up of the three lowest-order vibrational modes.

A general case, where a vibrational state of an optical mount 110 is the result of a number of vibrational modes is illustrated in the diagram of FIG. 6. Optical mount 110 is affixed to a substrate (not shown) at its sides 112, 114 and carries an optical component 116 mounted off-center on its left half.

The vibrational state of optical mount 110 is a superposition of the fundamental, second and third vibrational modes indicated separately by dashed lines. The displacement of optical component 116 produced by each of the three modes is indicated by dashed lines as well. The vibrational state or superposition of the three modes is not drawn for clarity, but it is understood that it is obtained by summing the contributions of the three modes at each point along the length of optical mount 110. It will also be understood that the vibrational state will differ depending on the relative phase between the modes.

The positions of anti-nodes of the vibrational modes are indicated by top arrows $AN_1$ through $AN_5$ and the positions of the nodes are indicated by bottom arrows $N_1$ through $N_5$. In accordance with the invention, a sensor 120 is attached to optical mount 110 at anti-node $AN_1$ belonging to the third vibrational mode in order to efficiently detect it. In addition, since the location of anti-node $AN_1$ is far away from the nodes of the other two modes, sensor 120 can also efficiently detect the fundamental and second modes while attached at this location. It is also possible to position sensor 120 at anti-nodes $AN_2$, $AN_4$ or $AN_5$. However, sensor 120 should not be placed at anti-node $AN_3$ of the first and third modes, since this position also corresponds to node $N_3$ of the second mode and thus sensor 120 would not be able to detect the second mode at all when attached at anti-node $AN_3$.

A person skilled in the art will recognize that still higher-order modes can contribute to the vibrational state of optical mount 110. These modes should be treated in the same manner. In other words, their nodes and anti-nodes should be identified and sensor 120 should be attached to optical mount 110 at locations far away from any nodes and as close as possible or even at anti-nodes. In fact, when possible two or more sensors can be attached to optical mount 110 in such positions.

Referring back to FIG. 2, it is now clear that sensors 28, 34 are attached at predetermined positions 30, 36 corresponding to anti-nodes of the fundamental and second modes. These are the only modes expected to contribute to the vibrational states of optical mounts 16, 18 respectively. The movements of optical mount 16 and optical component 20 are analogous to those presented in conjunction with optical mounts 50, 70. However, the consequent deviation of beam 24 differs, since optical component 20 is transmissive rather than reflective. Therefore, the linear and angular deviations of beam 24 passing through optical component 20 are obtained by analyzing the angle of incidence and the angle of transmission of beam 24 with the aid of Snell's law to determine the linear and angular deviations of beam 24. Such analysis is well known to a person skilled in the art. The movements of optical mount 18 and optical component 22 as well as the linear and angular deviation of beam 24 are analyzed on the basis of the analysis presented for optical mount 90 and Snell's law.

Figure 7:
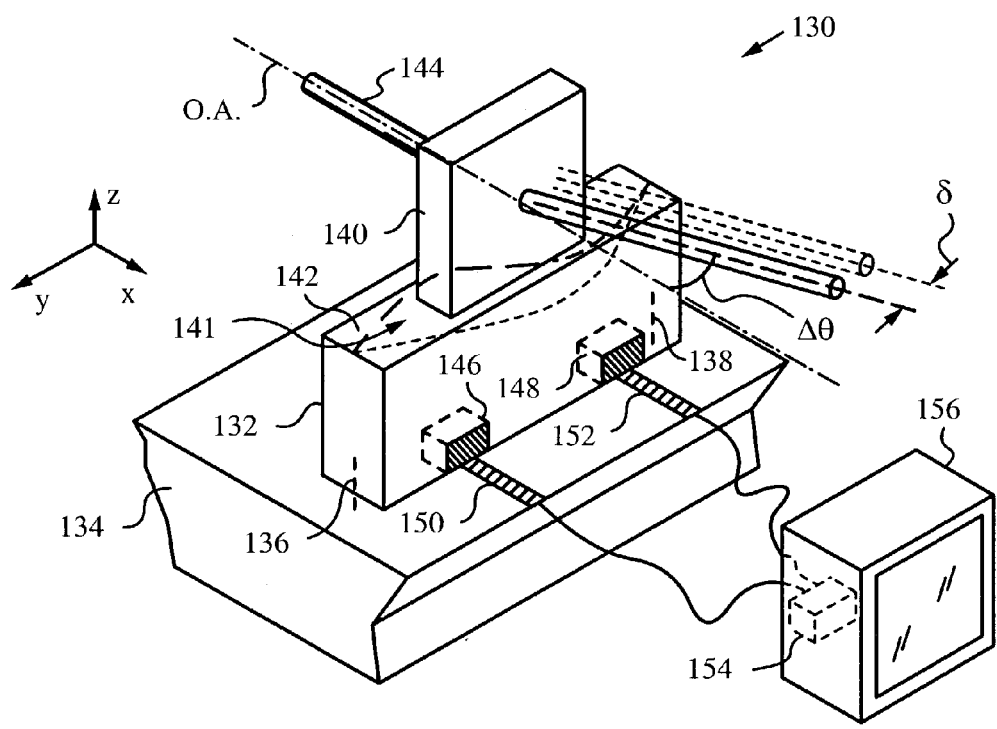
FIG. 7 is an isometric view of an optical mount equipped with embedded acceleration sensors and bearing an optical element.

FIG. 7 illustrates a portion of a beam guiding system 130 equipped with an optical mount 132 affixed on a substrate 134 by mounting pins 136, 138. Optical mount 132 bears a single optical component 140 at a location 141 at the center of a top face 142 of optical mount 132. An optical axis O.A. is indicated passing normal to and through the center of optical component 140. Also shown is a beam 144 propagating from the left and being transmitted through optical component 140.

Conveniently, a preliminary analysis of the possible vibrational states of optical mount 132 is performed before operating beam guiding system 130. Based on the results of this preliminary analysis only the two lowest vibrational modes, i.e., the fundamental mode and the second mode indicated in dashed lines, are expected to contribute to the vibrational state of optical mount 132. Thus, optical mount 132 has two sensors 146, 148 attached on side wall 150 at the anti-nodal points of the second mode. In the preferred embodiment of optical mount 132, sensors 146, 148 are accelerometers that are embedded in optical mount 132. Conductive traces 150, 152 are provided to obtain electrical signals from accelerometers 146, 148 during operation.

The vibrational state of optical mount 132 results in a total linear deviation δ and a total angular deviation Δθ of beam 144 while undergoing transmission through optical component 140. As explained above, the deviation is due to linear movement of optical mount 132 along optical axis O.A. and its tilt with respect to optical axis O.A. Sensors 146, 148 of optical component mount 132 are connected to a sensor circuit 154 residing in a monitor unit 156. Sensor circuit determines the deviation, i.e., δ and Δθ, and monitoring unit 156 displays it to a user.

Figure 8:
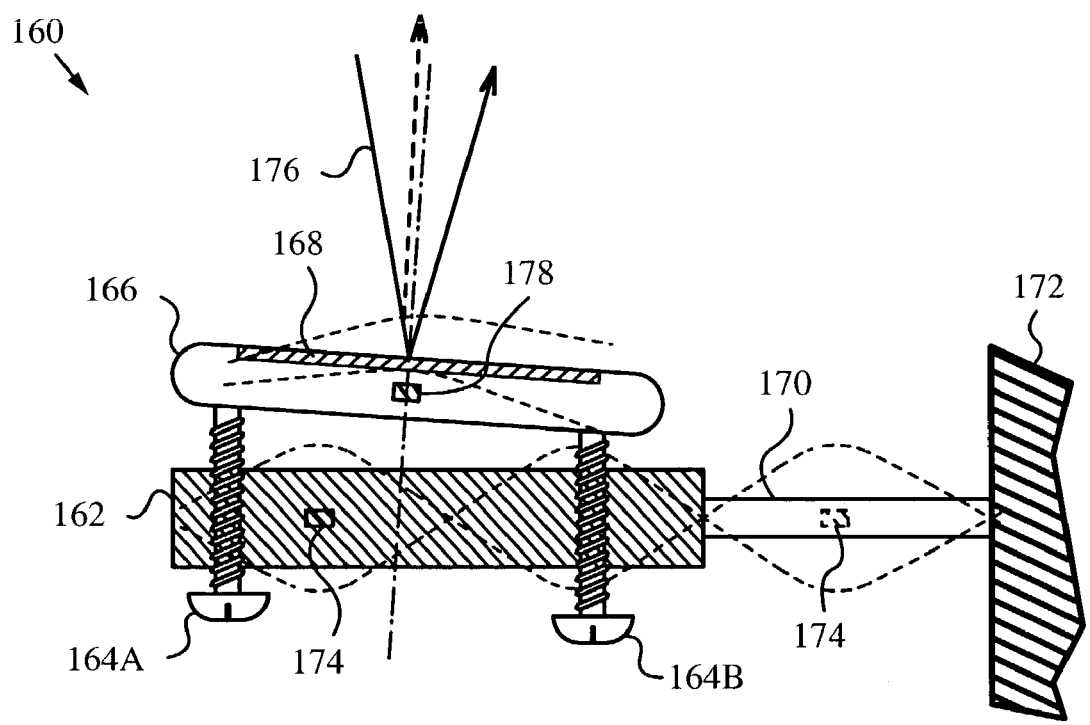
FIG. 8 is a top plan view of an adjustable optical mount bearing an optical element and experiencing a third-order vibrational mode.

FIG. 8 illustrates an adjustable optical mount 160 having a frame 162, an adjustment mechanism 164 consisting of two screws 164A, 164B and an adjustable plate 166. An optical component 168 is mounted on adjustable plate 166. In the present embodiment optical component 168 is a mirror.

Optical mount 160 has an attaching or mounting post 170 for affixing optical mount 160 to a side wall of an optical or opto-electronic assembly 172 (only portion shown) or any other mechanical support. Because of the combined length of frame 162 and mounting post 170, the vibrational state of optical mount 160 is most likely to consist of a third vibrational mode as indicated in dashed lines. In order to efficiently detect this mode, a sensor 174 is mounted at an anti-node of the third mode within frame 162. An alternative-position for sensor 174 within mounting post 170 is indicated in dashed lines.

The motion of adjustable plate 166 and hence the motion of mirror 168 resulting from frame 162 and post 170 experiencing the third mode is indicated in dashed lines. This motion is complex and includes linear displacement as well as tilt of mirror 168. Hence an incident beam 176 experiences linear deviation as well as angular deviation. The deviation of beam 176 is preferably kept as small as possible by selecting rigid and stiff materials for frame 162 and post 170. In addition, another sensor 178 is placed within adjustable plate 166 to monitor the motion affecting mirror 168.

For the purposes of the present invention the definition of a state includes a vibrational state, a thermal expansion state as well as any other state that deforms the optical mount and causes beam deviation. Thermal expansion states usually include slow thermal "vibrations" or modes induced by expansion and contraction of parts induced by heating and cooling. Such thermal modes affect mechanical, electronic and optical parts making up an optical mount or an optical or opto-electronic assembly using optical mounts in accordance with the invention.

Figure 9:
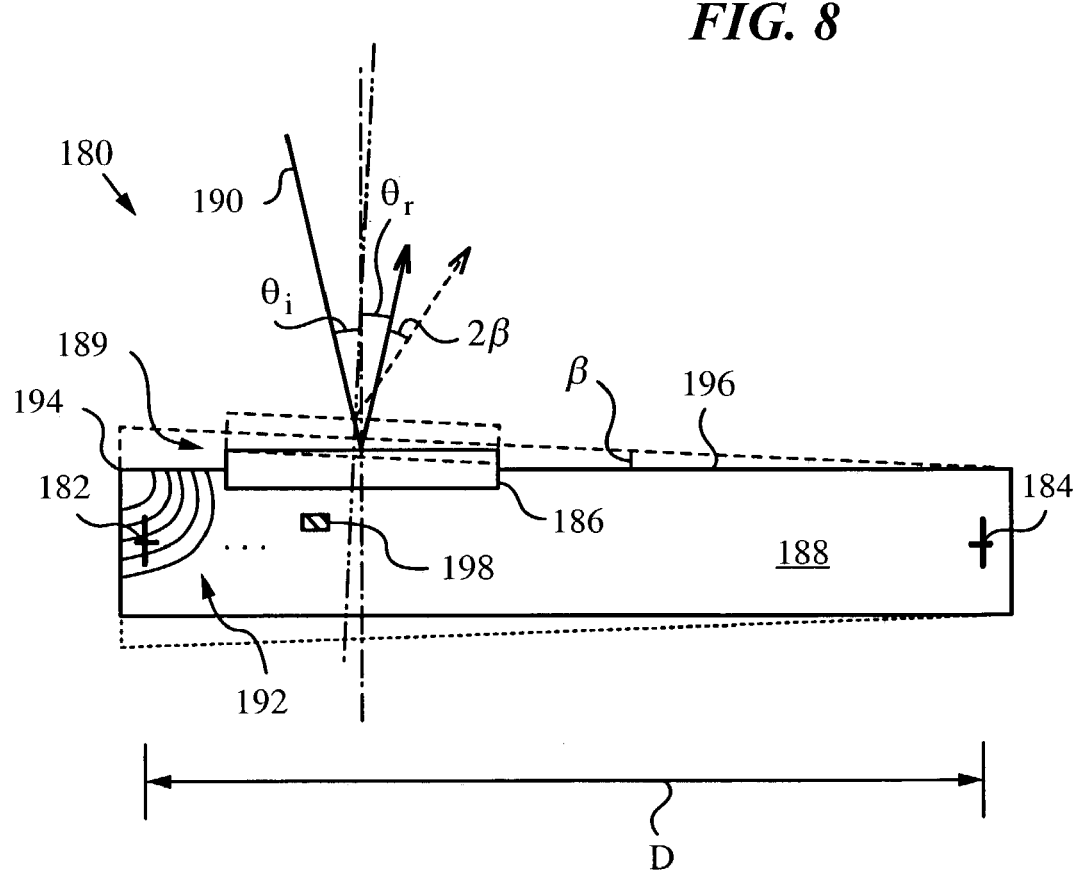
FIG. 9 is a top plan view of an optical mount bearing an optical element and experiencing thermal expansion and contraction.

FIG. 9 illustrates an optical mount 180 affected by a thermal expansion state. Optical mount 180 is affixed to a substrate (not shown) at points 182, 184 and bears a passive optical component 186 on top face 188 at a location 189 along an edge 196. An optical axis O.A. passes through the center of optical component 186 and a beam 190 is incident on optical component 186 at an angle of incidence $\theta_i$ with respect to optical axis O.A.

A heat source (not shown) applies a periodic thermal gradient 192 at a corner 194 of optical mount 180. Thermal gradient 192 results in the expansion of optical mount 180 as indicated in dashed lines. More specifically, the thermal expansion causes edge 196 of optical mount 180 to incline at an angle β with respect to the equilibrium position. As a result, optical component 186 is linearly displaced and tilted as indicated in dashed lines. The resulting angular deviation of beam 190 is equal to 2β. A linear deviation can be calculated from distance D between mounting points 182, 184 and angle β in accordance with standard geometrical principles that are well known in the art.

To monitor the thermal expansion state optical mount 180 employs a stress sensor 198 mounted near optical component 186.

Alternatively, a temperature sensor can be used, and thermal displacement calculated according to expected rates of thermal expansion. It should be noted that sensor 198 is in fact mounted near an anti-node of a fundamental thermal mode of a wavelength approximately equal to 2D. A person skilled in the art will also recognize that various heat sources can cause thermal expansion state of an optical mount. For example, active optical components such as laser diodes mounted on the optical mount may themselves set up thermal gradients causing thermal expansion states.

Figure 10:
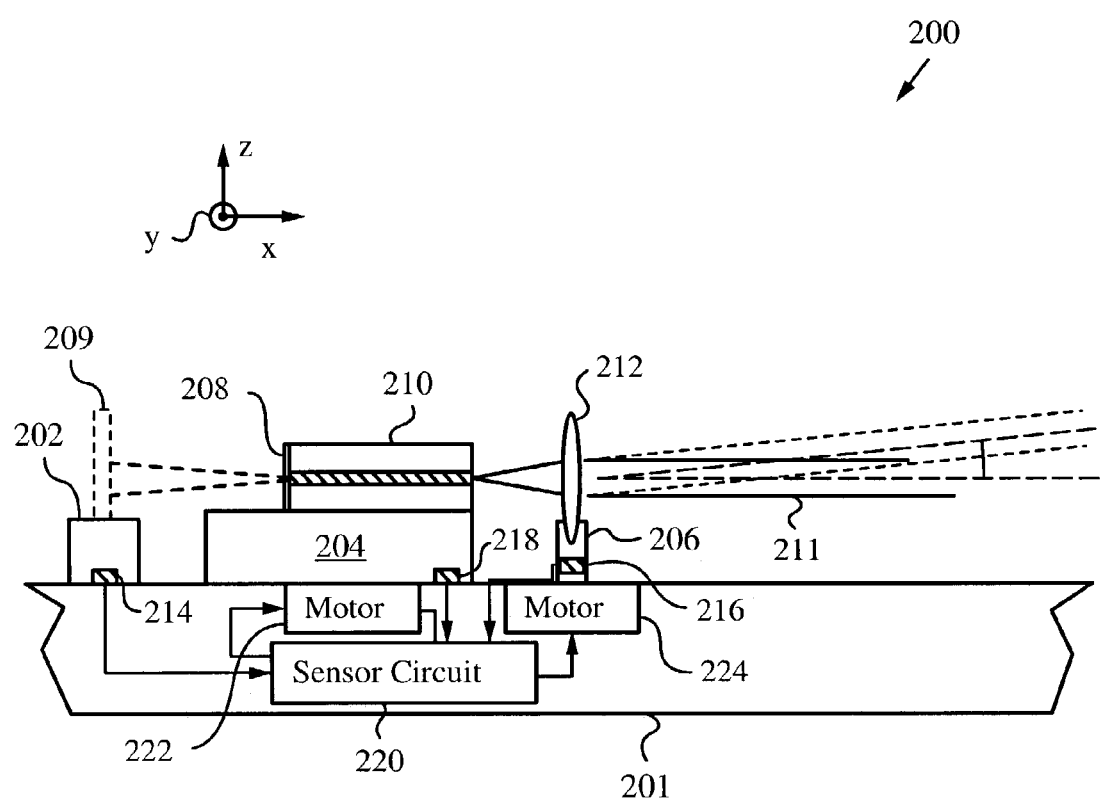
FIG. 10 is a side plan view of an opto-electronic assembly equipped with optical mounts bearing optical elements in accordance with the invention.

FIG. 10 illustrates in a side plan view a beam guiding system 200 implemented in an opto-electronic assembly 201 equipped with optical mounts 202, 204, 206 bearing optical elements 209, 210 and 212 respectively. Optical element 209 is a mirror, optical element 210 is a diode laser and optical element 212 is a collimating lens. Back-facet coated mirror 208 on diode laser 210 serves as a high reflector. Alternatively, a mirror 209 can serve as a high reflector. Laser diode 210 is a source of beam 211 and collimating lens 212 serves to collimate beam 211 and deliver it to an external application. For example, beam guiding system 200 is used in a laser pointer that uses collimated beam 211 for pointing at external objects.

Optical mounts 202, 206 are equipped with embedded acceleration sensors 214, 216 (accelerometers) and optical mount 204 has a strain sensor or a temperature sensor 218. Optical mounts 202, 206 experience mechanical vibrations manifesting in vibrational states and optical mount 204 experiences a thermal state due to thermal modes induced by the thermal gradient set up by diode laser 210. The positions of sensors 214, 216, 218 are determined in accordance with the above-taught principles of the invention. In this arrangement sensor 214 is a back-end vibration sensor needed to obtain the tip/tilt information about system 200.

A sensor circuit 220 is connected to all sensors 214, 216, 218 to monitor the vibrational states of optical mounts 202, 204 and the thermal state of optical mount 206. Sensor circuit 220 further contains logic for deriving the deviation of beam 211 indicated in dashed lines due to the vibrational states of optical mounts 202, 206 and thermal state of optical mount 204.

Beam guiding system 200 is also equipped with compensators 222, 224 for counteracting the thermal and vibrational states of optical mounts 204 and 206 respectively. Compensators 222, 224 can be implemented by any element selected from among piezoelectric actuators, voice coil electromagnetic actuators, servo motors and stepper motors as well as various types of vibration compensators including MEMs. In fact, compensator 222 can even be a thermal compensation element such as a Peltier element. In the present embodiment compensators 222, 224 are motors. Motors 222, 224 are connected to sensor circuit 220 such that the information derived by the logic contained in sensor circuit 220 can be used directly to counteract the vibrational state of optical mount 206 and the thermal state of optical mount 204. Alternatively, the thermal state can be counteracted by appropriate heaters and/or coolers.

The optical mounts, beam guiding systems and method of controlling deflection in accordance to the invention can be implemented in various systems using any type of optical mount bearing one or more optical elements. In particular, the mounts can bear one or more active and/or passive elements such as mirrors, lenses, gratings, beam-splitters, sources and detectors. The mounts themselves can be selected from among mirror mounts, translation stages, tilt stages, rotational stages, goniometers, optical breadboards and any other type of mounts exposed to mechanical or thermal states.

In view of the above, it will be clear to one skilled in the art that the above embodiments may be altered in many ways without departing from the scope of the invention. Accordingly, the scope of the invention should be determined by the following claims and their legal equivalents.

What is claimed is:

1. An optical component mount with beam deviation monitoring, said optical component mount comprising:
    a) a location for mounting an optical element for operating on a beam;
    b) at least one sensor attached to said optical component mount at a predetermined position to at least one mode of said optical component mount for determining a state of said optical component mount;
such that a deviation of said beam is determinable from said state.

2. The optical component mount of claim 1, wherein said state is selected from the group consisting of a vibrational state and a thermal expansion state.

3. The optical component mount of claim 1, wherein said predetermined position is at an anti-node of said at least one mode comprising said state of said optical component mount.

4. The optical component mount of claim 1, wherein said predetermined position is not at a node of any of said at least one mode comprising said state of said optical component mount.

5. The optical component mount of claim 1, wherein said sensor is selected from the group consisting of acceleration sensors and temperature sensors.

6. The vibration monitor of claim 5, wherein said sensor is embedded in said optical component mount.

7. The optical component mount of claim 1, further comprising a sensor circuit in communication with said sensor for determining said deviation from said state.

8. The optical component mount of claim 1, further comprising a compensator in mechanical communication with said optical component mount for counteracting said state.

9. The optical component mount of claim 8, wherein said compensator comprises an element selected from the group consisting of piezoelectric actuators, voice coil electromagnetic actuators, servo motors and stepper motors.

10. The optical component mount of claim 1, wherein an optical element is mounted in said location, said optical element being selected from the group consisting of mirrors, lenses, gratings, beam-splitters, sources and detectors.

11. The optical component mount of claim 10, wherein said optical component mount is selected from the group consisting of mirror mounts, translation stages, tilt stages, rotational stages, goniometers and optical breadboards.

12. A beam guiding system with beam deviation monitoring, said beam guiding system comprising:
    a) a plurality of optical component mounts;
    b) a plurality of locations for mounting optical elements on said optical component mounts for operating on a beam;
    c) at least one sensor attached to at least one of said optical component mounts at a predetermined position to at least one mode of said at least one of said optical component mounts for determining a state of said at least one optical component mounts;
such that a deviation of said beam is determinable from said state.

13. The beam guiding system of claim 12, wherein said state is selected from the group consisting of a vibrational state and a thermal expansion state.

14. The beam guiding system of claim 12, wherein said predetermined position is at an anti-node of said at least one mode comprising said state of said at least one of said optical component mounts.

15. The beam guiding system of claim 12, wherein said predetermined position is not at a node of any of said at least one mode comprising said state of said at least one of said optical component mounts.

16. The beam guiding system of claim 12, wherein said at least one sensor is selected from the group consisting of acceleration sensors and temperature sensors.

17. The beam guiding system of claim 16, wherein said sensor is embedded in said at least one of said optical component mounts.

18. The beam guiding system of claim 12, further comprising a sensor circuit in communication with said at least one sensor for determining said deviation from said state.

19. The beam guiding system of claim 12 further comprising at least one compensator in mechanical communication with said at least one of said optical component mounts for counteracting said state.

20. The beam guiding system of claim 19, wherein said at least one compensator comprises an element selected from the group consisting of piezoelectric actuators, voice coil electromagnetic actuators, servo motors and stepper motors.

21. The beam guiding system of claim 12, wherein at least one of said optical elements is selected from the group consisting of mirrors, lenses, gratings, beam-splitters, sources and detectors.

22. The beam guiding system of claim 21, wherein said at least one of said optical component mounts is selected from the group consisting of mirror mounts, translation stages, tilt stages, rotational stages, goniometers and optical breadboards.

23. The beam guiding system of claim 12, further comprising an evaluation unit for translating said state of said at least one optical component mount into a total deviation of said beam.

24. The beam guiding system of claim 12 comprising a laser pointer.

25. A method for controlling a deflection of a beam propagating in a beam guiding system comprising optical component mounts having locations for mounting optical elements thereon, said method comprising:
    a) attaching at least one sensor to at least one of said optical component mounts at a predetermined position to at least one mode of said at least one of said optical component mounts for determining a state of said at least one of said optical component mounts;
    b) translating said state into a deflection of said beam.

26. The method of claim 25, wherein said state is selected from the group consisting of a vibrational state and a thermal expansion state.

27. The method of claim 25, wherein said predetermined position is selected at an anti-node of said at least one mode comprising said state of said at least one of said optical component mounts.

28. The method of claim 25, wherein said predetermined position is not at a node of any of said at least one mode comprising said state of said at least one of said optical component mounts.

29. The method of claim 25, further comprising counteracting said state.

30. The method of claim 25, wherein said at least one sensor is attached to said at least one of said optical component mounts by embedding.

* * * * *